United States Patent [19]
Upadhyay et al.

[11] Patent Number: 6,115,409
[45] Date of Patent: Sep. 5, 2000

[54] INTEGRATED ADAPTIVE SPATIAL-TEMPORAL SYSTEM FOR CONTROLLING NARROWBAND AND WIDEBAND SOURCES OF INTERFERENCES IN SPREAD SPECTRUM CDMA RECEIVERS

[75] Inventors: Triveni N. Upadhyay, Concord; Wallace E. VanderVelde, Winchester; Kenneth A. Falcone, Burlington, all of Mass.

[73] Assignee: Envoy Networks, Inc., Billerica, Mass.

[21] Appl. No.: 09/336,787

[22] Filed: Jun. 21, 1999

[51] Int. Cl.[7] .................................................. H04B 15/00
[52] U.S. Cl. ........................ 375/144; 375/148; 375/267; 375/346; 375/347; 370/487; 370/488; 370/490; 455/63; 455/67.3; 455/135; 455/138
[58] Field of Search ..................................... 375/200, 202, 375/206, 207, 208, 267, 285, 347, 349, 350; 455/63, 67.3, 132, 137, 138, 139, 273, 276.1; 342/382, 383; 370/464, 488, 487, 490, 480, 481

[56] References Cited

U.S. PATENT DOCUMENTS

| | | |
|---|---|---|
| 4,431,995 | 2/1984 | Barton et al. ............................. 343/373 |
| 5,260,968 | 11/1993 | Gardner et al. ............................... 375/1 |
| 5,268,927 | 12/1993 | Dimos et al. . |
| 5,410,750 | 4/1995 | Cantwell et al. . |
| 5,512,956 | 4/1996 | Yan . |
| 5,566,209 | 10/1996 | Forssen et al. .......................... 375/262 |
| 5,596,600 | 1/1997 | Dimos et al. ............................ 375/206 |
| 5,694,416 | 12/1997 | Johnson . |
| 5,712,641 | 1/1998 | Casabona et al. . |
| 5,739,786 | 4/1998 | Greenspan et al. . |
| 5,754,138 | 5/1998 | Turcotte et al. . |
| 5,838,742 | 11/1998 | Abu-Dayya ............................. 375/347 |
| 5,870,430 | 2/1999 | Pipon et al. ............................ 375/229 |

OTHER PUBLICATIONS

Hooke, R. and T.A. Jeeves, "Direct Search Solution of Statistical Problems", J. ACM, vol. 8, 1961.

Compton, Jr., R.T., "Adaptive Antennas, Concepts and Performance", Prentice Hall, 1998.

Primary Examiner—Stephen Chin
Assistant Examiner—Dac V. Ha
Attorney, Agent, or Firm—Iandiorio & Teska

[57] ABSTRACT

An integrated adaptive spatial-temporal system and method for controlling narrowband and wideband sources of interference. The system includes an N element antenna array which receives a spread spectrum signal and interference signals, each element receiving a different phase shifted version of the spread spectrum and interference signals; a spatial filter including an antenna pattern former responsive to the antenna array which combines the phase shifted spread spectrum and interference signals according to controlling weights to null N−1 of the interference signal; an adaptive narrow band, e.g., temporal filter, responsive to the spatial filter for filtering any remaining narrowband interference signals from the combined signal; and feedback subsystem responsive to the narrow band filter for adjusting the controlling weights of the antenna pattern former until the operation of the spatial filter is optimized and nulls wideband interference signals before narrowband interference signals.

21 Claims, 13 Drawing Sheets

INTEGRATED ADAPTIVE SPATIAL-TEMPORAL SYSTEM FOR CONTROLLING NARROWBAND AND WIDEBAND SOURCES OF INTERFERENCES IN SPREAD SPECTRUM CDMA RECEIVERS

FIELD OF THE INVENTION

This invention relates to a system which controls and preferably eliminates both wideband and narrowband interference signals. The invention relates generally to radio receiving apparatus for processing spread spectrum signals in the presence of strong interferences including intentional jamming, and more specifically to direct sequence/spread spectrum systems in which the spatial and temporal resources are integrated and used effectively to mitigate a greater number of interfering sources than that which can be achieved by the spatial or temporal resources individually.

BACKGROUND OF THE INVENTION

Spread spectrum signals are used in digital radio systems for telecommunication and navigation purposes. In navigation systems (Global Positioning System, GLONASS, GPS/GLONASS), a receiver processes several spread spectrum signals, each one transmitted by a different satellite, to track the distance of the receiver from each satellite, and thereby, to determine its own position. In telecommunication systems, spread spectrum CDMA signals are used for (i) combating interference, (ii) transmitting at very low power to avoid detection/interception and (iii) multiplexing one channel over many users. This signal format is becoming the standard for wideband wireless communications.

Spread spectrum CDMA signal processing is characterized by expanding the bandwidth of the transmitted signal by a large factor (typically higher than 100) through pseudorandom noise (PN) modulation, and by compressing the bandwidth of the received signal by the same factor. PN modulation is implemented by two techniques: (i) by transmitting a PN sequence of binary pulses in each data bit interval, which is referred to as a direct sequence/spread spectrum (DS/SS) system, and (ii) by employing different carrier frequencies in each data bit interval (or fraction thereof) so that the record of used carrier frequencies constitutes a PN sequence, which is referred to as a frequency hopped/spread spectrum (FH/SS) system. In both methods, bandwidth compression is accomplished by correlating the received signal with the known PN chip or carrier frequency sequence. Due to spread spectrum signal processing, every incident interference is spread at the receiver over the whole system bandwidth, whereas the bandwidth of the desired signal is compressed. As a result, the effective interference power is smaller than the total incident interference power by a factor equal to the bandwidth expansion factor. For the above reason, the bandwidth expansion factor is referred to as the processing gain of the spread spectrum system.

In a DS/SS receiver, such as GPS, it is possible to suppress a narrowband interference beyond the processing gain, by filtering the received signal prior to despreading (also referred to as precorrelation) through a narrow band filter such as an adaptive temporal filter (ATF). A digital implementation of an ATF is the subject of existing patents, e.g., U.S. Pat. Nos. 5,268,927 and 5,596,600 incorporated herein by this reference. Other approaches for narrowband interference cancellation have used operations in the frequency domain, as evidenced by U.S. Pat. No. 5,410,750, which is are incorporated herein by this reference. These methods are not very effective, however, against wideband interference. In this disclosure, references to "adaptive temporal filter" or "ATF" are properly interpreted as including these methods, or any other self-contained approaches to narrowband interference cancellation.

The spread spectrum format of the GPS or other wideband signal also provides a degree of protection against wideband interference. But, even with these features, it is possible and practical for an adversary to deny spread spectrum CDMA signal reception in a geographic area by fielding a large number of wideband interferences or a mix of both wideband and narrowband interferences. Directional antennas, using multi-element arrays, have been used to provide the required protection. Several spatial (directional) interference cancellation techniques employing multi-element array antennas have been applied to combat wideband and narrowband interferences. In an adaptive array antenna (more generally referred to as spatial filters or smart antennas) antenna element outputs are multiplied by controlling weights to steer and shape the antenna array pattern to either direct nulls towards the jammers, direct a beam towards the desired signal, or form an antenna pattern that accomplishes both by optimizing the signal-to-interference-plus-noise (SINR) power ratio. An antenna weight control algorithm appropriate to the criterion is selected to produce the controlling weights. Application of adaptive antennae, i.e., the spatial filter, for interference suppression by forming antenna pattern nulls in the directions of interferers is existing art. The antenna controlling weights, to form the desired antenna pattern, can be applied at RF, at IF or at digital base band outputs of the antenna elements. In an analog implementation, the weights are applied at RF/IF, and are customarily represented as phase shift and attenuation. Limitations of analog electronic implementations for weight application include limited resolution in gain and phase control and imperfections including nonlinearity, temperature sensitivity and aging. In a digital implementation, the antenna element outputs are appropriately downconverted, filtered and digitized at or near base band in a signal conditioning module, and the controlling weights are applied digitally and represented in terms of in-phase (I) and quadrature (Q) weights. Application of the antenna controlling weights to produce the desired antenna array pattern, in this case, corresponds to digital complex multiplication and summation operations. Digital implementations of adaptive array antennae are the subject of existing patents. See, for example, U.S. Pat. No. 5,694,416, incorporated herein by this reference.

Regardless of the adaptive antenna implementation approach, the effectiveness of the adaptive antennae are constrained by the number of elements (N) in the array which controls the available degrees of freedom to form nulls towards the interferers. An N-element antenna array has N−1 degrees of freedom and, therefore, can be effective in forming only up to N−1 independent nulls. Since the size of the antenna array and the associated electronics is directly related to the number of elements, and since in most practical applications size, power, weight, and cost are at premium, increasing the number of antenna elements to deal with a larger number of interferers is costly because of the cost of the antenna element itself and the cost of electronics which includes signal conditioning subsystems associated with each element of the antenna pattern former. Most adaptive antennas have used between two and seven antenna elements depending on the application. Precision guided munitions applications tend to use fewer elements, typically three or four, because of their limited size. Aircraft applications, on the other hand, can afford to use somewhat larger arrays and the associated electronics.

It is possible to add degrees of freedom to an array antenna, a process which is effective against narrowband interference. Essentially, a delay line is added in each element channel so as to make available not only the current signal out of each element but also a number of delayed signals. The beam is then formed by summing, with appropriate weights, all of the current and delayed signals from all of the elements. If there are N antenna elements and M delays (including the zero delay) in each channel, the beam is formed from a total of N·M signals and the system controller must determine N·M weights which requires a computational process of an order of N·M or higher. This is referred to as Spatial-Temporal Adaptive Processing (STAP). The required processor power, however, becomes very burdensome even for modest values of N and M.

By contrast, if a spatial filter (order N) and a temporal filter (order M) can be implemented separately (order N+M), but integrated in an effective manner, the processing burden is much smaller. This process offers a more efficient means of dealing with larger fields of interferers consisting of a mix of both narrowband and wideband types than either increasing the number of antenna elements or introducing STAP processing. Until now, however, such a method has not been implemented.

Therefore, in summary, in the prior art, attempts have been made to combine spatial and temporal filters. Spatial filters, as discussed above, such as an adaptive antenna array system with N array elements, however, normally operate to receive a spread spectrum signal and to null N−1 interference signals based on signal strength and not whether the interference signal is wideband or narrowband. If, however, there are more than N−1 sources of interference and any one of these sources outputs a narrowband signal stronger than the weakest wideband interference signal, the spatial filter will inefficiently null the stronger narrowband interference signals instead of the weaker wideband interference signals. Since the temporal filter is ineffective against these wideband interference signals, they interfere with the receiver and render it unable to interpret the spread spectrum signal.

Thus, the previous attempts at combining the spatial filter with the temporal filter, which consisted of cascading the two filters—spatial filter followed by the temporal filter, have been unsuccessful and have been reported to fail to improve interference suppression performance further than what is achievable by the spatial filter alone.

SUMMARY OF THE INVENTION I

It is therefore an object of this invention to provide an integrated adaptive spatial-temporal system for controlling narrowband and wideband sources of interference.

It is a further object of this invention to provide such a system which successfully protects a receiver from both narrowband and wideband interference signals.

It is a further object of this invention to provide such a system which does not require an unduly large number of adaptive antenna array elements.

It is a further object of this invention to provide such a system which does not add significantly to the cost or complexity of the antenna system.

This invention results from the realization 1) that previous attempts to use spatial filters in conjunction with temporal filters in order to eliminate sources of interference received with a spread spectrum signal failed because the spatial filters automatically operated to null interference signals based on their strength instead of their bandwidth thus passing on wideband interference signals to the temporal filter which is effective only with respect to narrowband sources of interference; 2) that these wideband signals then interfered with the spread spectrum (e.g., GPS) signal; and 3) that a more effective integrated system can be effected by including a feed back system which ensures that the spatial filter is configured to null wideband interference signals first according to its capacity leaving the narrowband interference signals to be filtered out by the temporal filter.

In the subject invention, the feedback subsystem functions in a sense to analyze the interference signals and to evaluate whether the spatial filter has been used to the best of its ability to filter only, or at least to prioritize, the wideband interference signals leaving the narrowband interference signals to the temporal filter which can handle a larger number of narrowband interference signals.

The way the feedback subsystem operates is to adjust the controlling antenna weights of the adaptive antenna array until it prioritizes signal nulling based on bandwidth instead of signal strength. This is accomplished by optimizing the total performance of the system in terms of signal to interference plus noise at the output.

As described in the Background of the Invention above, a spatial filter can null both wideband and narrowband signals but it has an upper limit of N−1 nulling directions where N is the number of antenna array elements, a number limited by the size and cost of the system. A temporal filter, on the other hand, can cost efficiently filter many interference signals but is limited to only filtering narrowband interference signals and is ineffective at filtering wideband interference signals.

The system of this invention can be explained by imagining that each interference signal is analyzed and categorized according to whether it is a wideband or narrowband interference signal. The spatial filter, being limited to nulling only N−1 interference signals, is put to work to the best of its ability (N−1) to null the wideband interference signals first and then, if any array elements are still available, to nulling narrowband interference signals second. There may be many narrowband interference signals which were not nulled by the spatial filter but these narrowband interference signals can be effectively filtered by the temporal filter which is connected to the output of the spatial filter. The feedback subsystem is the means for "analyzing" and "categorizing" the interference signals. In actuality, this result is achieved by maximizing the signal-to-interference-plus-noise-ratio (SINR) at the output of the temporal filter.

The present invention provides an effective and low-cost means of receiving spread spectrum signals in the presence of strong interference including intentional jamming. Working with an array of antenna elements, the system affords the means of nulling a greater number of interfering sources than the number of antenna elements by utilizing both the spatial (directional) and temporal (frequency content) characteristics of the interferers.

Although the suppression of interferers by an adaptive array antenna by forming beam pattern nulls in the directions of the interferers is existing art, this method is effectively limited to N−1 interferers, where N is the number of antenna elements. Increasing the number of antenna elements to deal with a larger number of interferers is costly because of the cost of the element itself and the cost of the electronics associated with each element including the preamplifier, downconverter, automatic gain control and analog-to-digital converter.

Increasing the capacity of the array to null narrowband interferers by adding delays in the elements channels (Spatial-Temporal Adaptive Processing) is costly because of the large computational requirements of STAP processing.

The subject invention takes advantage of the fact that a large number of interferers can be suppressed by a low-cost adaptive transversal filter (ATF) if the interferers have narrowband spectra.

A digital implementation of such a filter is the subject of existing patents, see U.S. Pat. Nos. 5,268,927 and 5,596,600, but this filter is not effective against wideband interferers. Such interfering sources must be suppressed by acting on their directional (spatial) property rather than on their frequency (temporal) property.

The primary advantage of the present invention is the successful integration of a spatial filtering property, which is effective against all point sources of interference including wideband interference, and a temporal filtering property, which is effective against narrowband interference in a less costly implementation than simply increasing the number of antenna elements to deal with the same number of interferers.

An important aspect of this invention is the manner in which this integration is accomplished. It is not enough just to provide the resources to effect spatial filtering (array antenna) and temporal filtering (adaptive transversal filter). Rather, these resources must be controlled in an integrated manner whereby the spatial filtering resources are assigned to null the wideband interferers. The present invention accomplishes this control by use of a weight-optimizing algorithm to control the antenna combining weights so as to optimize a signal-to-noise ratio form of criterion at the output of the integrated filter—including both its spatial and temporal sections. The signal-to-noise ratio at the output of the system is the ultimate criterion that one would like to maximize. This goal is accomplished in the present invention by actually forming the criterion, through a combination of measurement and computation, and then optimizing it with respect to the choice of the antenna weights by means of a suitable optimizing algorithm. When the global optimum is found, it must have the property that the spatial filter resources are used to suppress wideband interference and the temporal filter resources are used to suppress narrowband interference. Any other situation would be less than optimum.

A by-product advantage of controlling the antenna weights by direct optimization in real time is that the optimum choice of weights compensates for error effects including mutual coupling among the antenna elements and gain and phase variations between the element channel electronics. Even without calibrating these channels, a set of weights exists which compensates for the errors, and the optimum-seeking algorithm finds those weights.

The subject invention provides a means of receiving spread-spectrum signals in the presence of strong interference including intentional jamming. It provides the capability to suppress a mix of wideband and narrowband interferers with a lower cost implementation than a corresponding larger adaptive array antenna or STAP processing system. The subject invention successfully integrates the beam forming capability of an array antenna and the frequency notching capability of a transversal filter in such a way that each capability is used to its best advantage against a mix of a narrowband and wideband interferers. Finally, excellent performance in signal-to-interference ratio improvement is realized regardless of uncalibrated mutual coupling and channel errors.

Another primary advantage of the present invention is that it provides a low-cost means of extending the capability of an array antenna of given size (number of elements) to deal with a larger number of interferers if at least some of them are narrowband. This is accomplished by synergistic application of both spatial filtering (beam forming) and temporal filtering (frequency notching) resources to the interferers of appropriate type. In an all-digital implementation, excellent signal-to-noise ratio performance is achieved even in the presence of uncompensated mutual coupling and channel error effects.

The present invention has successfully solved this problem by an architecture which affords a means of nulling a greater number of interfering sources than the number of antenna elements by utilizing both the spatial (directional) and temporal (frequency content) characteristics of the interferers.

The present invention also exploits the synergism between the spatial filter and temporal filter techniques of interference suppression and utilizes an optimizing weight control algorithm based on the SINR criterion.

This invention features an integrated adaptive spatial-temporal system for controlling narrowband and wideband sources of interference. Such a system includes an N element antenna array which receives a spread spectrum signal and interference signals, each element receiving a different phase shifted version of the spread spectrum and interference signals. There is a spatial filter including an antenna pattern former responsive to the antenna array which combines the phase shifted spread spectrum and interference signals according to controlling weights to null N−1 of the interference signals. A narrow band filter such as a temporal filter is responsive to the spatial filter for filtering any remaining narrowband interference signals from the combined signal. A feedback subsystem is responsive to the temporal filter for adjusting the controlling weights of the antenna pattern former until the operation of the spatial filter is optimized and nulls wideband interference signals before narrowband interference signals.

The feedback subsystem may include a processor programmed to calculate the signal-to-interference-plus-noise-ratio (SINR) at the output of the temporal filter and to adjust the controlling weights until the SINR is maximized. In this case, the feedback subsystem typically includes power measurement means for determining the output power of the temporal filter. The feedback subsystem may further include weight controller means for searching for a set of weights which optimize the operation of the spatial filter. The weight controller means itself may include a cost function algorithm and a closed loop optimizer.

The feedback subsystem in one embodiment includes power measurement means for measuring the average squared magnitude of the output from the temporal filter and a weight controller including an algorithm for adjusting the controlling weights.

Typically, the spread spectrum signal is transmitted by Global Positioning System satellites. In this invention, the SINR is the signal power at the output of the temporal filler divided by the total power at the output of the temporal filter wherein the signal power is computed from the beam pattern formed by a given set of antenna weights, and the total power is measured as the average squared magnitude of the output signal.

In another sense, the subject invention comprises a spatial filter responsive to an antenna array for nulling interference signals received with a spread spectrum signal; a temporal filter for filtering any remaining narrowband interference signals from the spread spectrum signal and an output for transmitting the filtered spread spectrum signal; and means for analyzing the output of the temporal filter and in response adjusting the spatial filter.

In still another sense, the integrated adaptive spatial-temporal system for controlling narrowband and wideband sources of interference includes a spatial filter responsive to an antenna for nulling interference signals received with a spread spectrum signal; a temporal filter with an input responsive to the spatial filter for filtering any remaining narrowband interference signals from the spread spectrum signal and an output for transmitting the filtered spread spectrum signal; and a feedback subsystem having an input connected to the output of the temporal filter and an output connected to the spatial filter.

This invention also features a method for controlling narrowband and wideband sources of interference, the method comprising: nulling interference signals received with a spread spectrum signal in a spatial filter; filtering any remaining narrow band interference signals in a temporal filter and transmitting the filtered spread spectrum signal; and analyzing the output of the temporal filter and in response adjusting the spatial filter.

The analyzing step usually includes determining an output power of the temporal filter and searching for a set of weights which optimize the operation of the spatial filter. In this step, the signal-to-interference-plus-noise-ratio (SINR) is calculated at the output of the temporal filter. The controlling weights are then adjusted until the SINR is maximized. The analyzing step may include measuring the average squared magnitude of the output from the temporal filter.

In another sense, the featured method comprises using an N element antenna array to receive a spread spectrum signal and interference signals, each element receiving a different phase shifted version of the spread spectrum and interference signal; combining the phase shifted spread spectrum and interference signals in a spatial filter according to controlling weights to null N−1 of the interference signals; filtering any remaining narrowband interference signals in the combined signal in a temporal filter; and adjusting the controlling weights until the operation of the spatial filter is optimized and nulls wideband interference signals before narrowband interference signals. The adjusting step includes calculating the signal-to-interference-plus-noise-ratio (SINR) at the output of the temporal filter and adjusting the controlling weights until the SINR is maximized.

BRIEF DESCRIPTION OF THE DRAWINGS

Other objects, features and advantages will occur to those skilled in the art from the following description of a preferred embodiment and the accompanying drawings, in which.

DESCRIPTION OF THE PREFERRED EMBODIMENT

Figure 1:
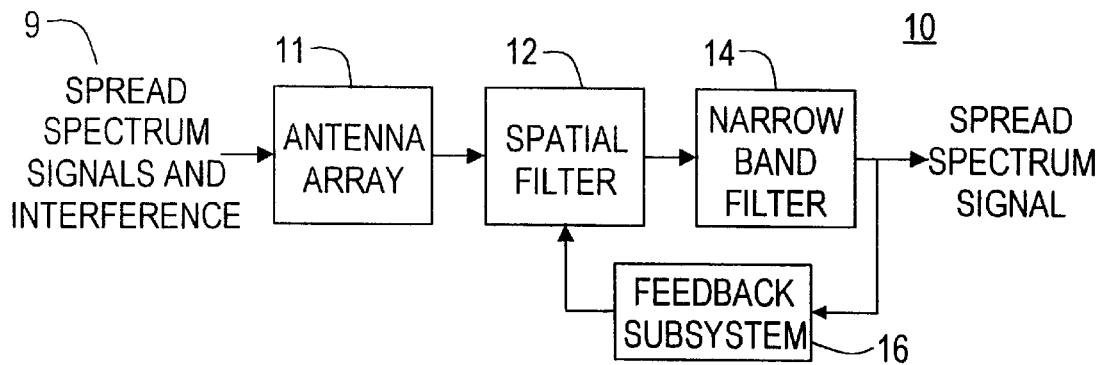
FIG. 1 is a block diagram showing an integrated adaptive spatial and temporal filter architecture for a spread spectrum receiver, in accordance with a preferred embodiment of the invention.

Integrated adaptive spatial-temporal system 10, FIG. 1, for controlling narrowband and wideband sources of interference, of this invention, includes an N element antenna array which receives the desired spread spectrum signals 9 and interference signals. Each element 1, 2 . . . N of array 11 receives a different phase shifted version of the spread spectrum and interference signals. Spatial filter 12 typically includes antenna pattern former 30, FIG. 3, responsive to antenna array 11 which combines the phase shifted spread spectrum and interference signals according to controlling weights W to null N−1 of the interference signals. Narrow band filter 14, FIG. 1, such as a temporal filter, is responsive to spatial filter 12 for filtering any remaining narrowband interference signals from the combined signal.

Feedback subsystem 16 is responsive to the output of filter 14 and functions to adjust the controlling weights W of the antenna pattern former until the operation of spatial filter 12 is optimized and nulls wideband interference signals before narrowband interference signals. In the preferred embodiment, feedback subsystem 16 is embodied in a processor programmed to calculate the signal-to-interference-plus-noise-ratio (SINR) at the output of the temporal filter and to adjust the controlling weights until the SINR is maximized.

Figure 2:
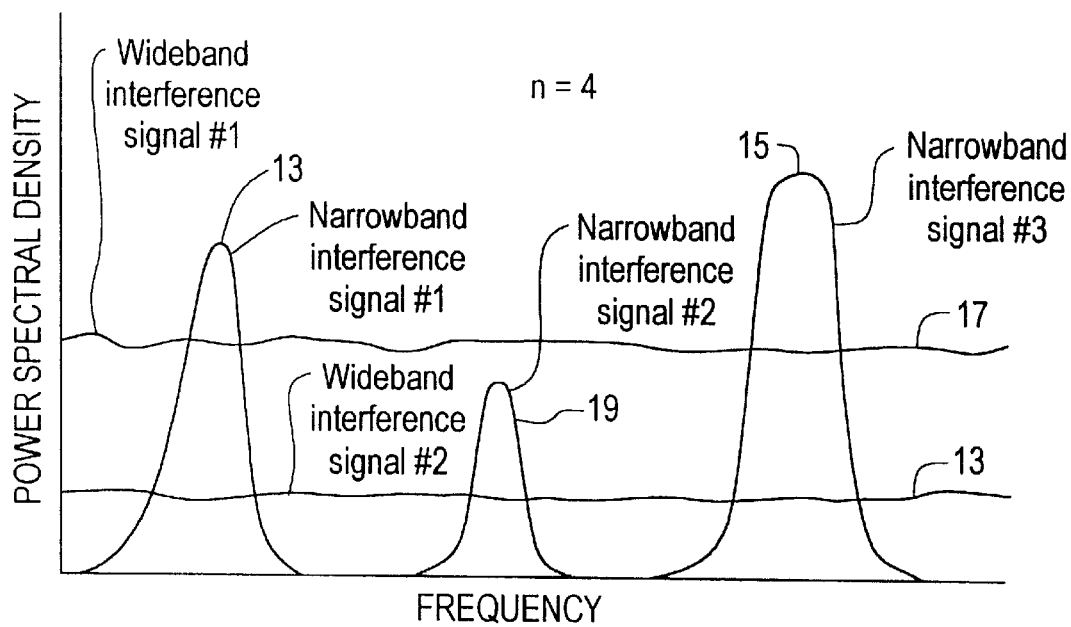
FIG. 2 is a graph showing power spectral density versus frequency illustrating how the subject invention deals with both wide and narrowband sources of interference.

Consider as an example FIG. 2 and an N=4 element antenna array 11. Spatial filter 12, which may be configured as set forth in U.S. Pat. No. 5,694,416, can null N−1 or 3 total interference signals, wideband or narrowband. Typically, spatial filter 12 is configured in the prior art to null the strongest signals, here narrowband interference signals 13 and 15 and wideband interference signal 17. Spatial filter 12, then, has operated to its capacity and narrowband interference signal 19 and wideband interference signal 13 are presented to temporal filter 14, FIG. 1. Filter 14, however, which may be constructed as set forth in U.S. Pat. No. 5,268,927 or 5,410,750, is generally ineffective at suppressing wideband signal 13. Thus, wideband signal 13 in the prior art would have been carried along with the spread spectrum signal to the receiver making it difficult if not impossible to correctly process the spread spectrum signal.

In the subject invention, however, feedback subsystem 16 functions to analyze the output of temporal filter 14 and to adjust spatial filter 12 if any interference signals are present with the spread spectrum signal after processing by filter 14.

In the illustrative example above, feedback subsystem 16 would reconfigure spatial filter 12 to null wideband signals 17 and 13, and one of the two strong narrowband signals, 13 or 15, FIG. 2. Then, narrow band filter 14, FIG. 1, adequately suppresses the remaining narrowband signals rendering the spread spectrum signal clean and useful to a receiver such as a GPS receiver.

Thus, system 10 is directed to an apparatus for processing spread spectrum signals to suppress any sources of wide or narrowband interference—through the use of spatial 12 and usually temporal 14 filters—without significantly adding noise or distortion.

Figure 3:
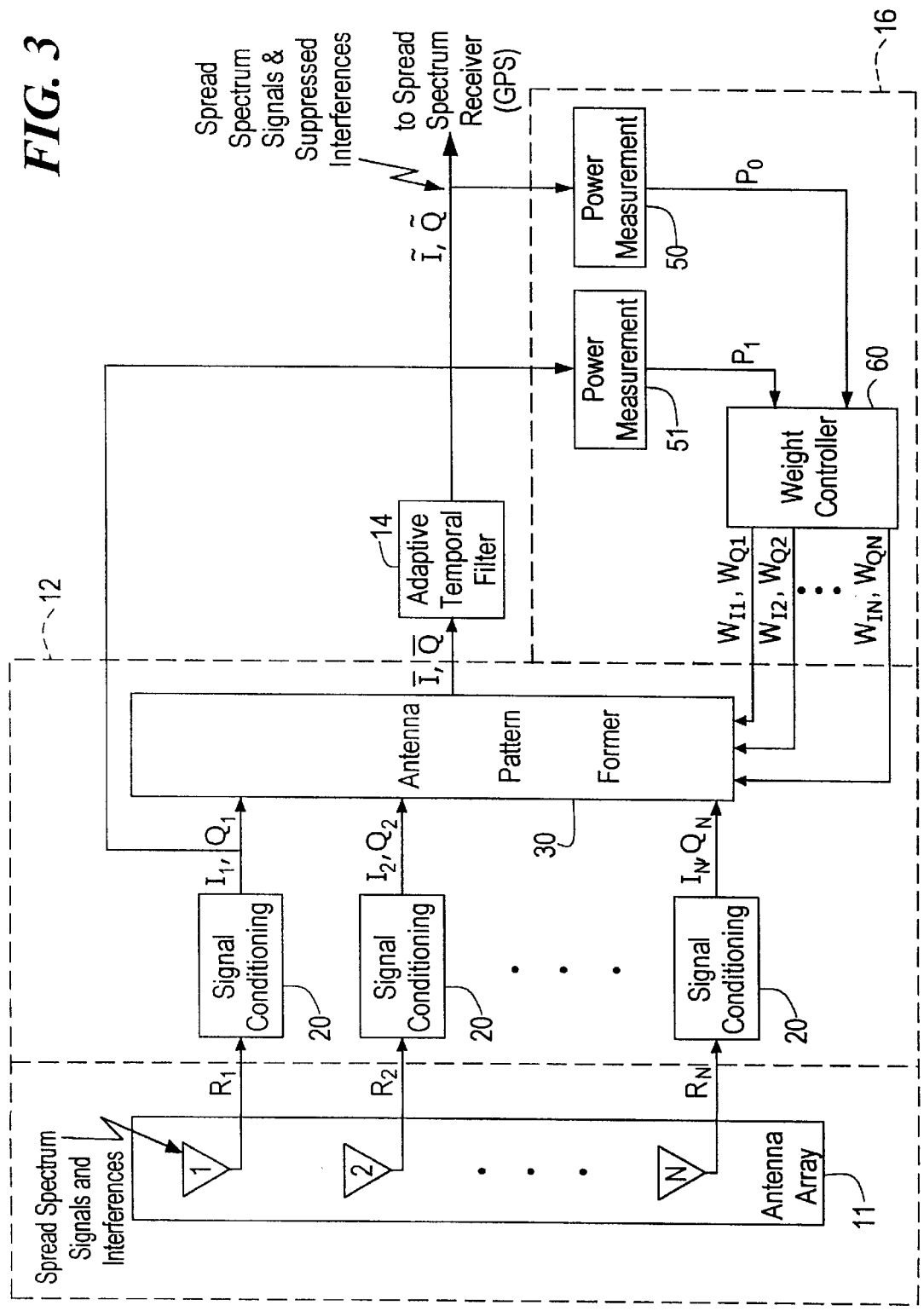
FIG. 3 is a more detailed block diagram of the system of the subject invention.

FIG. 3 is a more detailed block diagram showing the use of integrated adaptive spatial and temporal filters in a direct sequence/spread spectrum (DS/SS) receiver. The implementation may be digital or analog, but the preferred embodiment is digital. The signals $R_i$ are received from the N antenna array elements 11. The antenna array should contain at least two elements, but the number of elements is not limited otherwise. These signals include a number of Pseudorandom Noise (PN) codes translated to some common RF carrier frequency, and can be referred to as PN-channels plus in-band interference. Each signal conditioning subsystem 20 prepares the signal for use in spatial filter 12. Antenna pattern former 30 implements the weights of spatial filter 12. Temporal filter 14 removes narrowband interference and its output is suitable for use as the input to a spread spectrum receiver (not shown). The output of temporal filter 14 is also used by power measurement subsystem 50 of feedback subsystem 16 to generate an average output power measurement. This measurement is used to determine the effectiveness of each configuration of the spatial filter weights W. Weight controller 60 of feedback subsystem 16 normalizes the output power measurement with respect to input power measurement 51 taken from one of the array elements, and uses it as feedback mechanism to determine the weights W it sends to the antenna pattern former 30.

Figure 4:
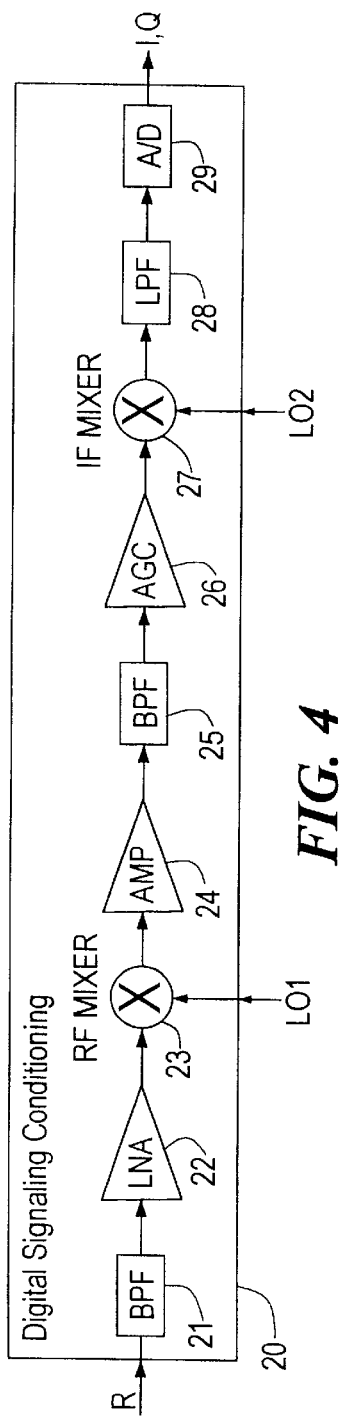
FIG. 4 is a block diagram of a digital implementation of the signal conditioning subsystems of FIG. 3.

Each signal conditioning subsystem 20, FIG. 4, in the preferred digital embodiment, includes band pass filter 21 which removes out of band noise and interference. Low noise amplifier 22 preamplifies the signal to reduce the impact of thermal noise added throughout the signal conditioning. The first conversion stage 23 mixes the signal with an externally supplied local oscillator, LO1, to shift the signal from an RF to an IF. IF amplifier 24 supplies additional gain and the following band pass filter 25 removes the IF image frequency. Automatic gain control 26 adjusts the amplifier gain to calibrate the signal strength with the thresholds of the analog to digital converter 29. IF mixer 27 combines another externally supplied local oscillator, LO2, with the signal to shift it from IF to baseband or some appropriate near-baseband carrier frequency. The last down-conversion stage involves quadrature mixing to derive an analog in-phase signal I(t) and an analog quadrature signal Q(t). Low pass filter 28 removes the image frequencies. These signals are sampled and quantized by multi-bit analog-to-digital (A/D) converters 29, to obtain the digital in-phase signals $I_n$ and the digital quadrature signals $Q_n$. The tested system was intended for reception of GPS signals. The final channel bandwidth was 20 MHz, the sampling frequency was 20 MHz, and the A/D converter for each channel was 12 bits wide.

Figure 5:
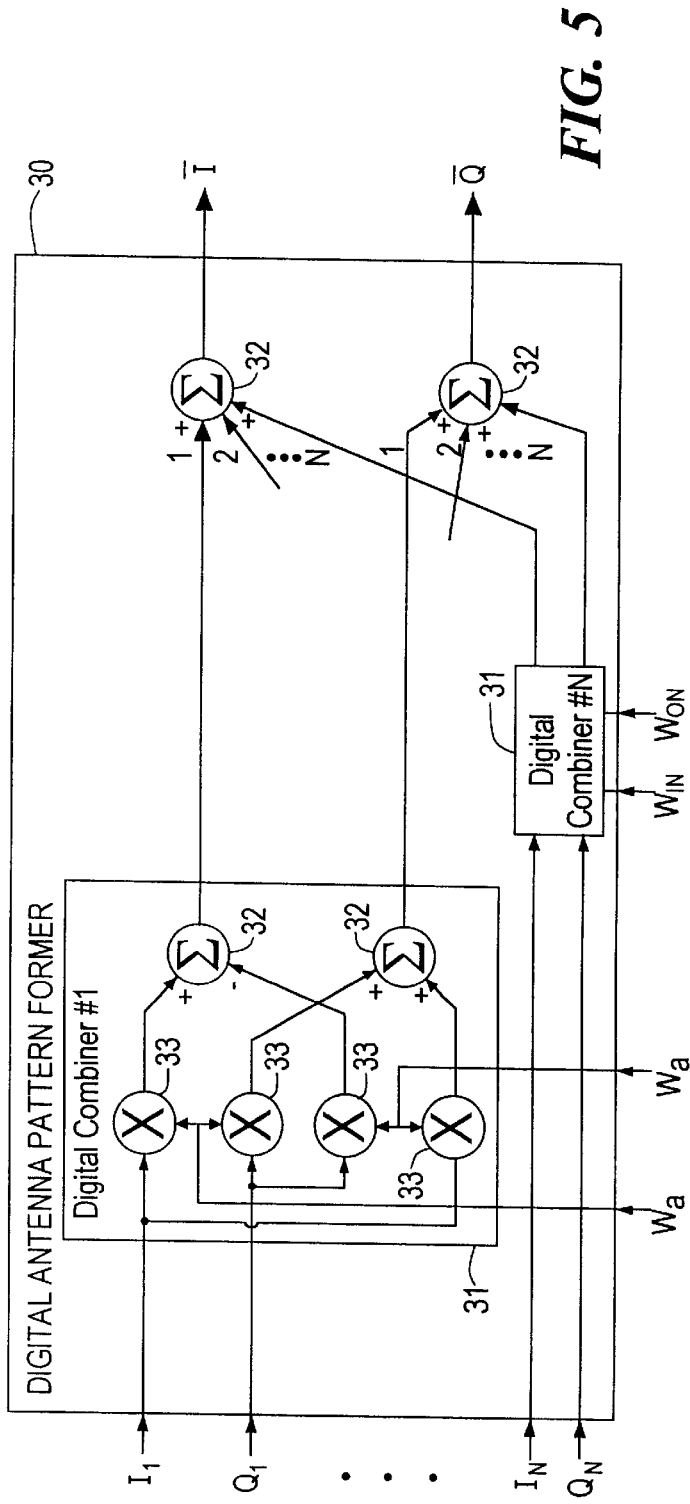
FIG. 5 is a block diagram of a digital implementation of the antenna pattern former shown in FIG. 3.

Antenna pattern former 30, FIG. 5, in the preferred digital embodiment, receives the outputs of the signal conditioning subsystem which are digitally combined in block 31 using complex weights determined by the adaptive spatial filter (ASF) algorithm in the Weight Controller 60, FIG. 3. The in-phase weighted signal is formed by multipliers 33 which multiply the in-phase signals $I_n$ by the in-phase weights $W_{in}$, n=1, 2, ... N and subtracting the product of the quadrature signals Qn and the quadrature weights $W_{qn}$. The quadrature weighted signal is formed by multiplying the quadrature signals $Q_n$ by the in-phase weights $W_{In}$ and adding the product of the in-phase signals $I_n$ and the quadrature weights $W_{qn}$. The in-phase signals from each element (digital combiner n, n=1, 2, ... N) are added to generate the in-phase combined signal, $\tilde{I}$, and the quadrature signals from each combiner are added to generate quadrature combined signal, $\tilde{Q}$. The complex I and Q combiner configuration of FIG. 5 may correspond to a telecommunications system with QPSK modulation or to a GPS system with sequential L1/L2 (1575/1228 MHz) BPSK modulation. A BPSK DS/SS system only requires a digital combiner. The tested system used weights quantized to 16 bits. The precision after the multiplier was 28 bits, truncated to 17 bits. The precision after the final adder was 20 bits, and the top three and bottom 5 bits were dropped to generate 12 bit outputs.

Figure 6:
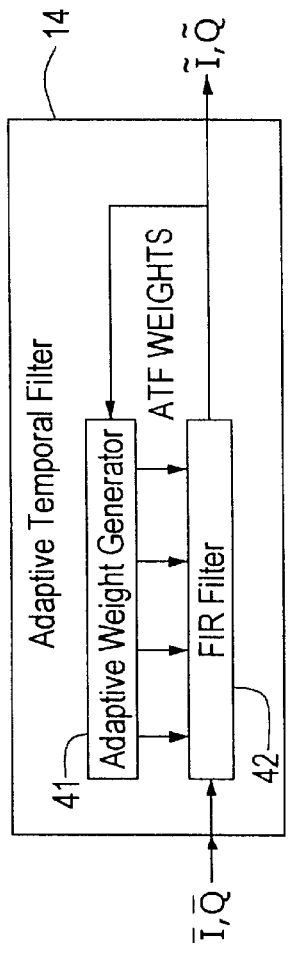
FIG. 6 is a block diagram of the digital adaptive temporal filter shown in FIG. 3.

Adaptive Temporal Filter (ATF) 14, FIG. 6, in the preferred digital embodiment, operates such that each antenna pattern former 30 output requires a separate ATF circuit 14. FIR filter 42 contains a tapped delay line and implements simple weights created by the adaptive weight generator 41. ATF 14 suppresses narrowband interference in the combiner signal, so that it delivers a signal with a higher signal-to-noise (plus distortion) power ratio (SNR) than the combiner output has. It accomplishes this forming a notch in its transfer function at the frequency of each narrowband interferer. The tested system used a model of an existing digital ATF which operates at the system sampling frequency of 20 MHz and has 30 taps and weights.

The multi-bit ATF output signals $\tilde{I}$ and $\tilde{Q}$ are then measured to provide feedback to the adaptive spatial filter algorithm of feedback subsystem 16, FIGS. 1 and 3, of this invention.

Figure 7:
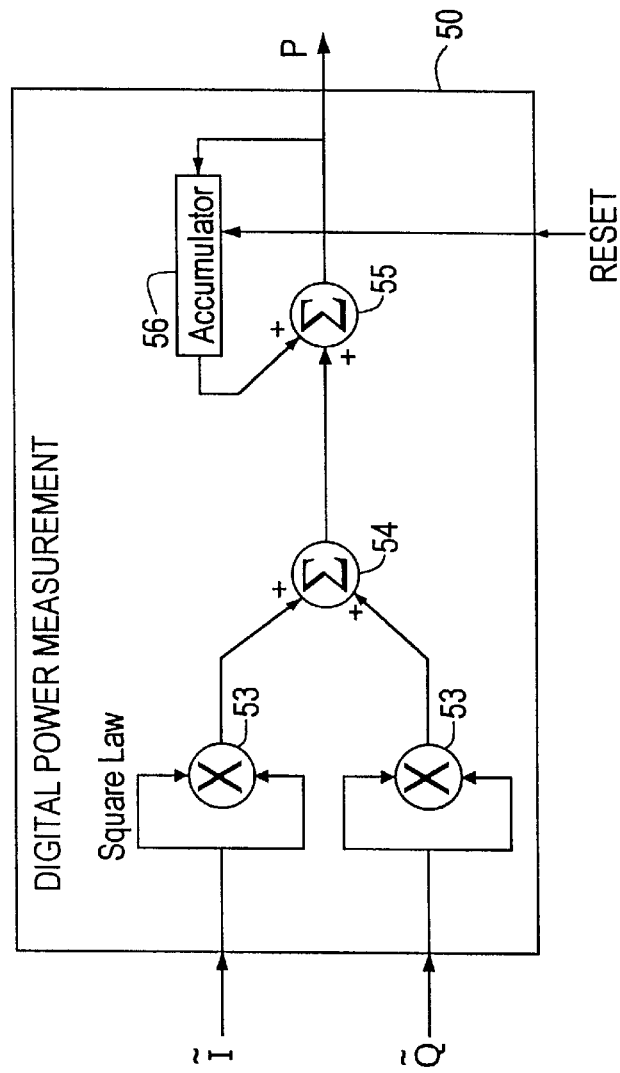
FIG. 7 is a block diagram of a digital implementation of the power measurement subsystem shown in FIG. 3.

Power measurement function 50, FIG. 7, in the preferred digital embodiment, operates to find the instantaneous power of the ATF outputs by squaring in subfunction 53 the in-phase output and adding as shown at 54 this to the square of the quadrature output. By adding as shown at 55 together the instantaneous power samples over a number of samples, a digital power measurement is obtained in accumulator 56. This nonnegative power measurement is the average output power for the period of time from which the samples were taken. Since the system uses the power measurement as feedback on the effectiveness of the weights used by antenna pattern former 30, FIG. 3, this period of time must account for delay through the ATFs 14 to ensure that it is measuring the performance of the current set of weights and not the previous set. The tested system used 128 instantaneous power samples to define an average power measurement. There were 12 bits of precision at the input. Squaring the inputs generated a 24 bit output, that was truncated to 16 bits. The power measurement output represents the full 24 bits of the accumulator.

Figure 8:
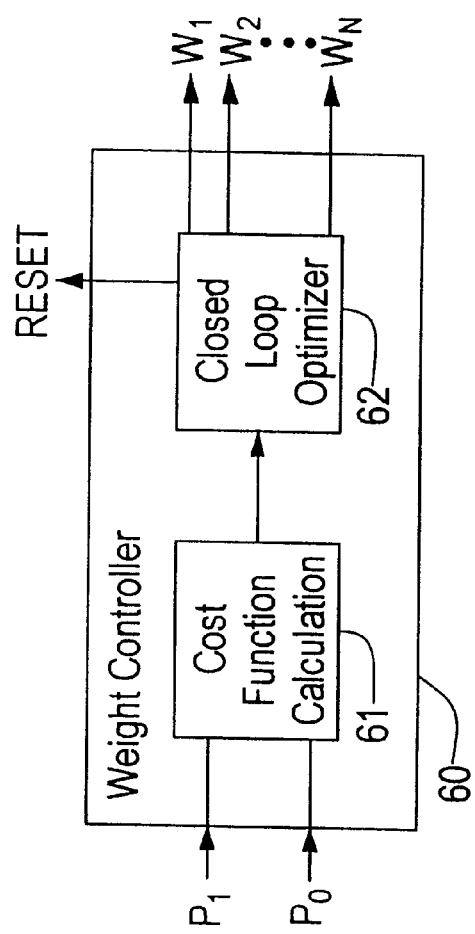
FIG. 8 is a block diagram of the spatial weight controller subsystem shown in FIG. 3.

Weight controller 60, FIG. 8, includes an architecture which uses a cost function 61 to provide feedback on the successfulness of the current set of weights. Assuming that there are sufficient degrees of freedom in spatial filter 12 to cancel the wideband interferers and in the ATFs 14 to cancel the narrowband interferers, then the optimum solution would have all of the significant wideband interference sources canceled by spatial filter 12 as discussed in the illustrative example described above with respect to FIG. 2.

Here, narrowband interference signals are defined as having less than one-tenth of the bandwidth of the wideband spread spectrum signal. It is expected that the ATF 14, given enough time, will attenuate the spectral peaks of the narrowband interference down to the wideband spectrum level at the output of spatial filter 12. If the wideband interference level is significantly above thermal noise, then the wideband spectrum level will be determined by the wideband interference. Since this wideband interference has a wider bandwidth at the same level of the canceled narrowband interference, the average power measurement will consist of mostly wideband interference power. The objective of the spatial filter is to minimize this power. To cancel the wideband interference without canceling the desired signals, a cost function is formed by taking the ratio of the power measurement to an approximation of the signal power. The signal power is estimated by forming a steering matrix based on the likely locations of the spread spectrum sources. This steering matrix is combined with the current set of weights to generate a signal power estimate.

Figure 9:
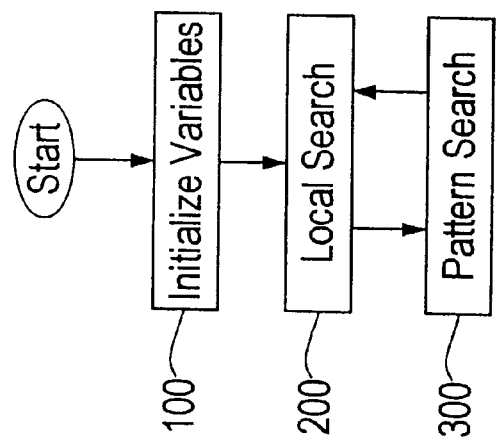
FIGS. 9–15 are flow charts depicting the operation of the software operating on the microprocessor of this invention which implements the preferred feedback subsystem of this invention.
Figure 10:
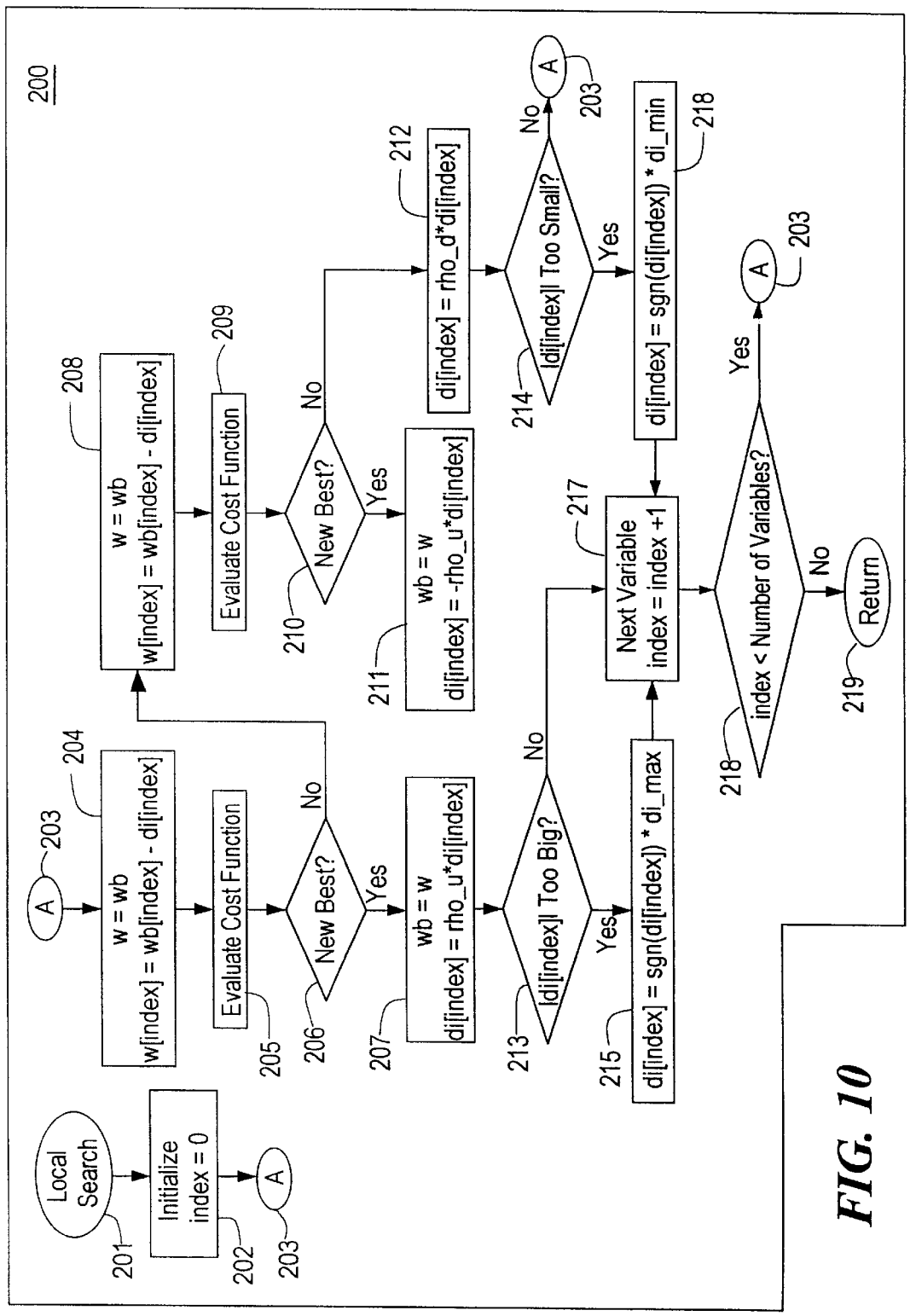
Figure 11:
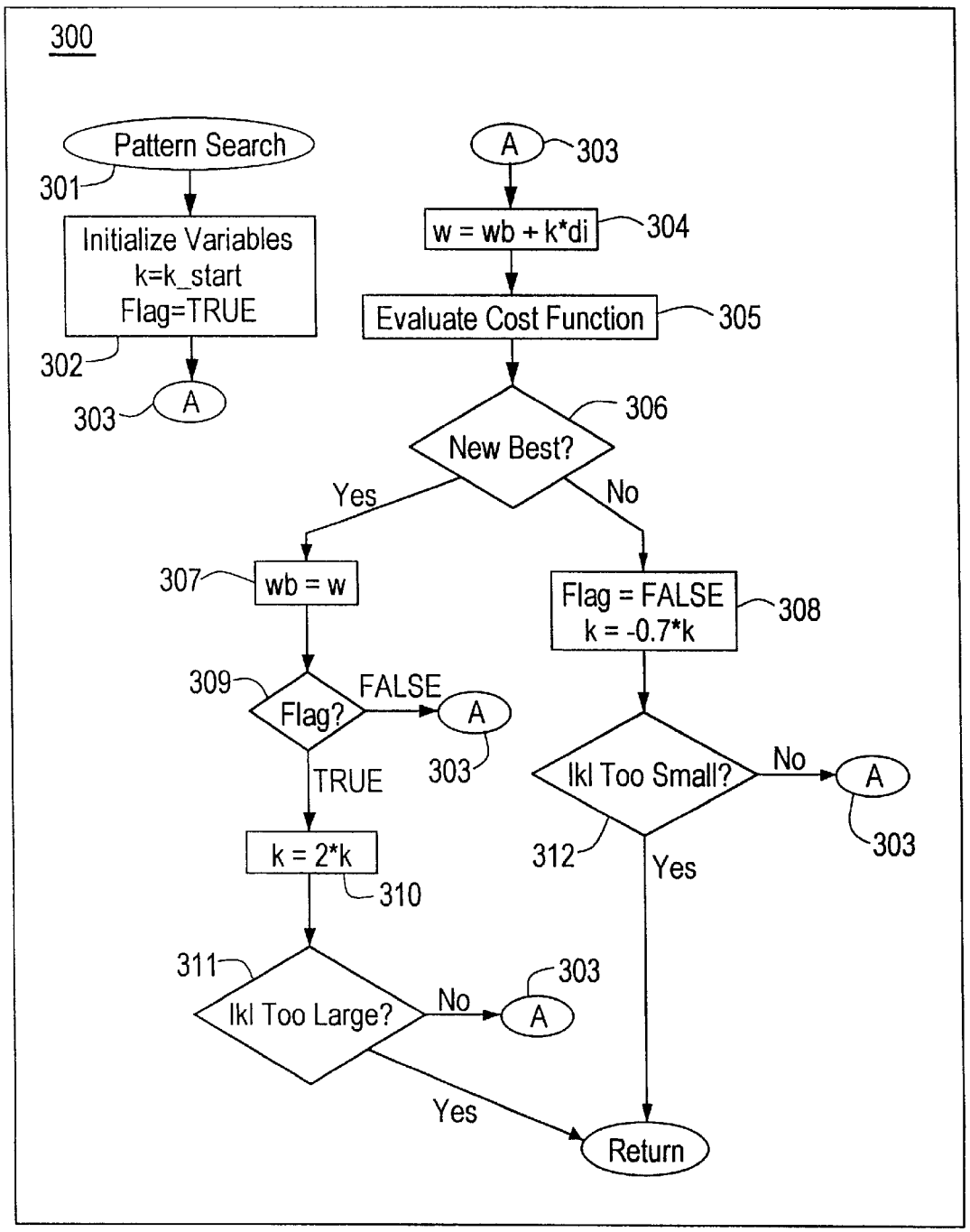

Closed loop optimizer 62, FIG. 8, of weight controller 60 attempts to minimize wideband interference by minimizing the cost function described above using the spatial weights. The algorithm that is used by the tested system to determine the weights is based on the Hooke and Jeeves Method of Optimization. See Hook, R. and T. A. Jeeves, Direct Search Solution to Numerical and Statistical Problems, J.ACM, Vol. 8, 1961. This algorithm, implemented here in a microprocessor, uses a direct search procedure, FIG. 9, consisting of local 200 and pattern 300 searches to find the set of weights that produces the smallest cost function value, FIG. 9. The optimization begins with a local search that explores the benefits of individually changing the real and imaginary parts of each weight, FIG. 10. The local search in FIG. 10 will test the cost function 205 in the same direction found effective on the previous local search 204, and if the new cost function value is lower than the best, step 206, then it will increase the step size and save the new weights, step 207. This is called a successful test. If the new cost function value is higher than the best, a failed test, then it will try the other direction, step 208. If this test also fails, then it will decrease the step size (212) and try the other direction, step 203. The algorithm will test each weight in turn, step 217, until it finds an improvement or reaches the minimum local search step size as shown at 213 and 214. After the local search (200) is completed, the algorithm will start a pattern search, step 300. The pattern search in FIG. 11 will test a move that changes all weights in proportion to the step sizes found in the local search as shown at 303 and 304. If this move is successful, then it will save the new weights (307) and increase the step size (310) and try the same direction again. If the move is a failure, then it will decrease the step size (308) and try the other direction (303). This procedure continues until reaching the maximum (311) or the minimum (312) pattern search step size.

The Hooke and Jeeves algorithm was originally designed to work in a static and deterministic environment. It has been modified in this invention to work with the cost function derived from random dynamic power measurements. The variance of the power measurement is minimized by use of high precision digital signals averaged over multiple samples. Since the cost function is a random variable and the Hooke and Jeeves algorithm compares all test statistics with the best value, order statistics dictate that the mean of the best value will be biased towards zero. To prevent the weights from getting locked onto a sub-optimal vector, the best cost is periodically reevaluated—each reevaluation best cost has a mean equal to the mean of the cost function for the given weights. In the case when either the antenna or interference source is moving, this reevaluation ensures that the best cost mean will equal the cost function mean for the given weights at the current time. The ATF adds its own dynamic effect. This system allows some time for the ATF to adapt to the new spatial weights, but the ATF will not have enough time to completely converge before a new power measurement is started. Since the ATF and ASF are adapting simultaneously, the slowly converging ATF may show enough improvement to make a failed test appear successful. The impact of these false successes is minimized by placing a maximum step size on the local and pattern searches. When a pattern search reaches this maximum step size, then the algorithm will move on to the local search.

The preferred embodiment of the integrated system offers a number of additional techniques for dealing with dynamics and random effects. The random dynamics of the ATF are totally eliminated in the tested system and best known embodiment by periodically freezing the ATF weights. A four phase test power measurement cycle is used where: 1) the ATF is allowed to adapt while samples generated using the best weights propagate through the ATF, 2) a best cost reevaluation power measurement is performed, 3) test weights are sent to the antenna pattern former and data is allowed to propagate through the ATF, and 4) a test power measurement is performed. This effectively recalibrates the weight controller 60, FIG. 8, every time the ATF adapts, so that it will always be working with the current state of the interference environment—within the duration of one test power measurement cycle. Slower variations in the wideband interference environment will be compensated for by adaptation in the weight controller. Slow variations in the narrowband interference environment will be handled by the ATF. To calibrate out faster wide and narrowband variations, an input power measurement is performed on the first antenna element, and each best or test output power measurement is normalized by dividing by the input power measurement performed on the same samples. In order to operate on the same samples, there must be a delay in the start time for the output power measurement to compensate for the delay through the ATF. The tested system used 128 sample power measurements meaning that variations slower than 384 samples or 19.2 microseconds would be calibrated out.

The preferred embodiment uses the output of the ATFs for the spread spectrum receiver, as well as evaluation of the cost function for the test weights. This can be accomplished by sending the digital data to a receiver or by converting it to analog and upconverting back to the RF carrier frequency. Because the adaptive algorithm is always trying to improve the performance, failed test cases will cause temporary spikes in the interference power. A convergence test reduces the size of the local search step size multiplier and the initial pattern search step size when the algorithm is considered converged. The test uses two separate statistics to determine the state of convergence over a period of time. The first is a sign test statistic—generated by comparing the current reevaluation of the best cost with the previous reevaluation of the best cost and counting the number of times the current cost is greater. The second statistic subtracts the final reevaluation of the best cost from the first reevaluation of the best cost during the period and normalizes with respect to the theoretical standard deviation. Using these two statistics, the current state of the algorithm is categorized as massively diverging—which causes a reset, diverging—which increases the local search step size multiplier and initial pattern search step size, static—which decreases the local search step size multiplier and initial pattern search step size, and converging—which increases the local search step size multiplier and initial pattern search step size.

Figures 12, 13:
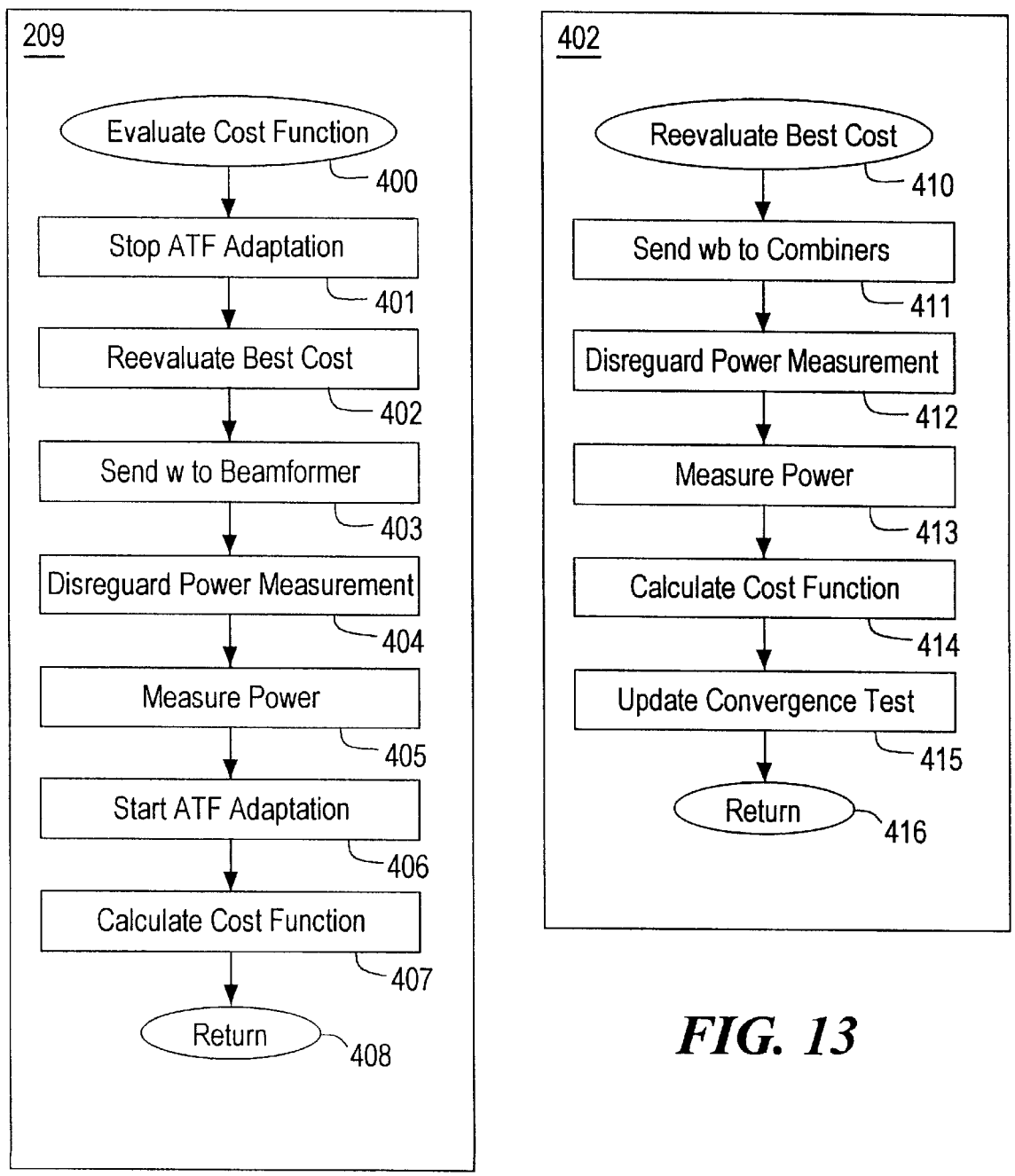

FIG. 12 shows the test cost function implementation. First, the ATF adaptation is stopped, step 401, in order to ensure that the test and best power measurements use the same ATF weights. The best cost is then reevaluated, step 402. This efficiently recalibrates the spatial filter by removing temporal variations in the input power, the automatic gain control, and the ATF weights. Then the test weights are sent to the beamformer as shown at 403. The resulting power measurement is ignored in the test configuration, step 404, in order to allow samples using the old weights to pass through the ATF. The second power measurement (405) yields the input power from one of the elements and the output power from the ATF. The ATF is allowed to adapt, step 406, while cost function calculations, step 407, are being performed for the search algorithm.

Figure 14:
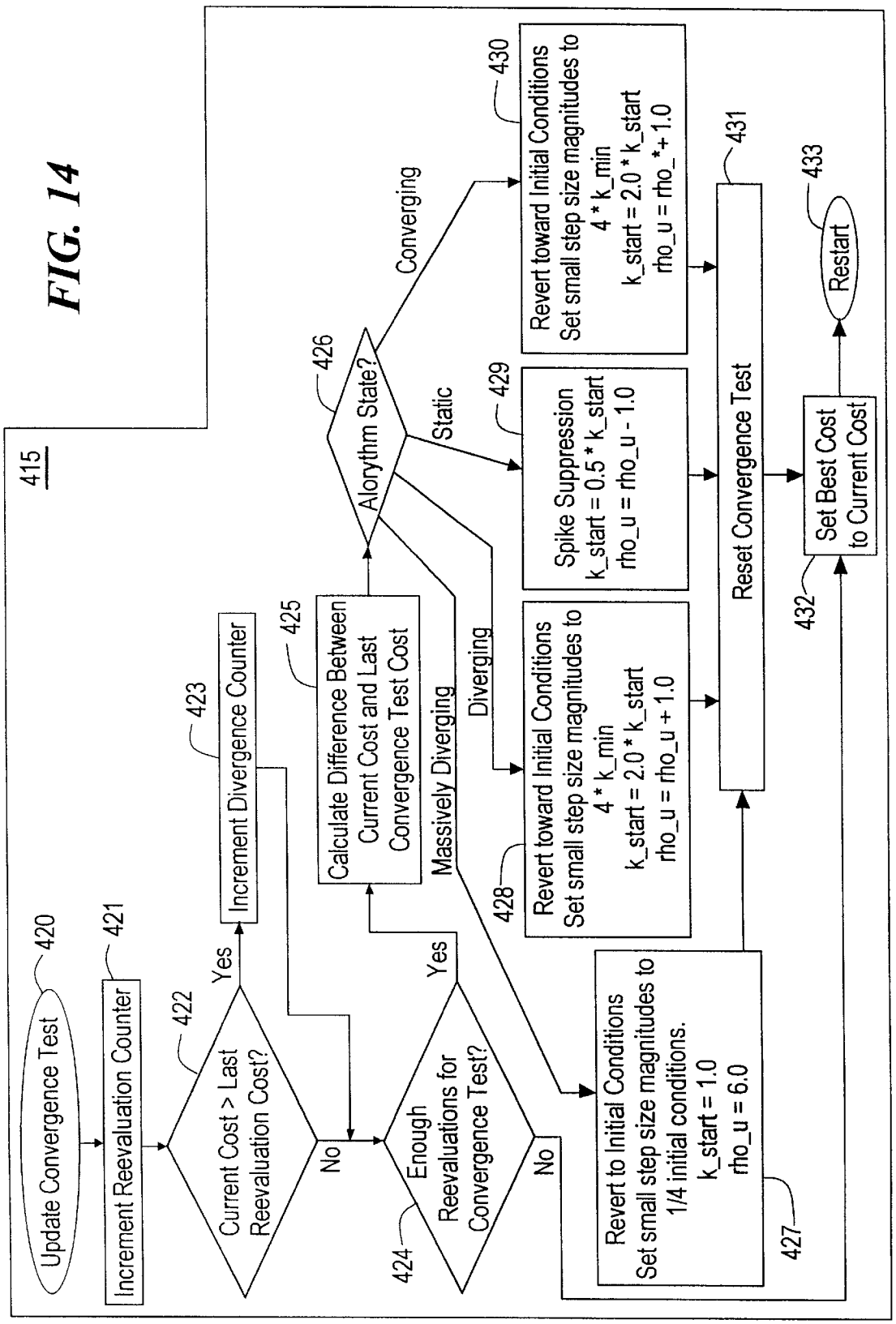

FIG. 14 shows the convergence test update. The number of reevaluations since the last convergence test is incremented, step 421, and the divergence counter is incremented, step 423, if the current best cost is greater than the best cost from the last reevaluation. When enough reevaluations are performed, then the current cost is compared with the last convergence test cost, step 425. The counters are used to generate a sign test statistic that is used along with the overall change in best cost to determine the current state of the optimizer algorithm, step 426. The state of the algorithm is used to modify the algorithm parameters while the weights remain unchanged. If the algorithm is massively diverging, then the optimizer parameters will revert to initial conditions, step 427. If the algorithm is diverging or converging, then the optimizer parameters will revert toward the initial conditions, but will not be set equal to them as shown at 428 and 430. If the algorithm is static, then the optimizer parameters will be reduced to minimize the power levels of failed tests, step 429. The convergence test statistics are then reset, step 431, and the saved best cost is updated, step 432, before returning to the best cost revaluation.

Figure 15:
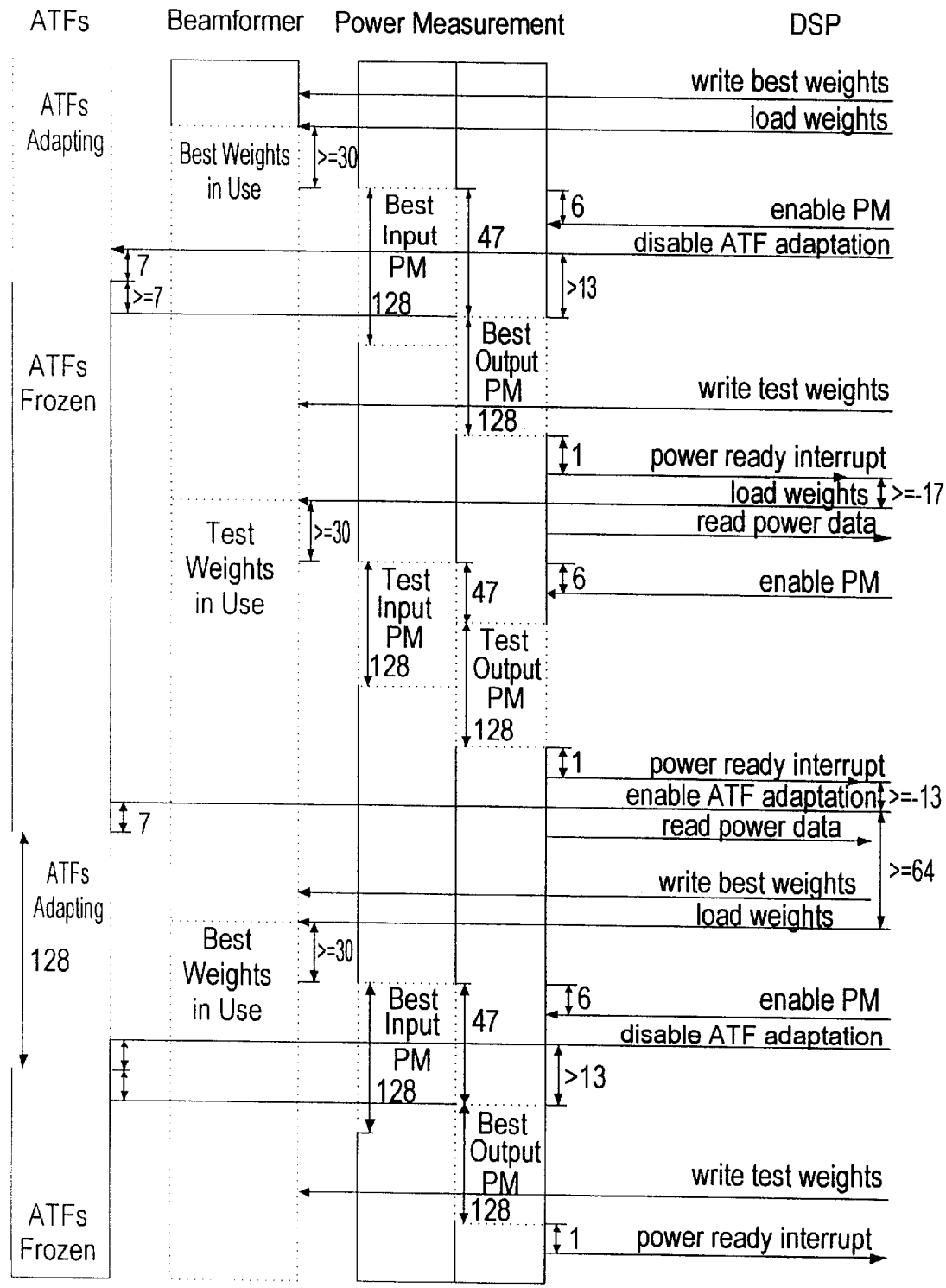

FIG. 15 demonstrates a more time efficient implementation to be used in the actual hardware. Time dimensions are given in sample durations. Negative dimensions indicate that events could most efficiently be timed to occur before their trigger events because of hardware latencies.

It is important to the performance of the system of this invention that weight controller 60, FIG. 8, function as an optimization algorithm using a meaningful measure of the system performance as the criterion to be optimized—either minimized or maximized depending on its definition. This is because good performance requires use of spatial filter 12 resources to suppress wideband interference and the temporal filter 14 resources to suppress narrowband interference—if both types of jamming are present. The computational effort to effect allocation of the filter system resources in this manner by analyzing the spectral and directional properties of the input signal and forming beam pattern nulls and temporal filter notches accordingly would be unnecessarily complex.

Instead in this invention the same result is achieved in an indirect manner—by searching for the set of antenna weights W which optimizes the total performance of the system. Throughout this search, adaptive temporal filter 14 is controlled by its usual logic which seeks to attenuate any strong narrowband components of its input signal. With the total system performance optimized, it must be true—if there are more jammers than the antenna array can null—that spatial filter 12 is nulling wideband jammers and the temporal filter is nulling narrowband jammers. This must follow because any other situation would be less than optimal.

So, optimization as the basis for weight control is central to the integrated system concept. The choice of algorithm to control the search for optimum is not fundamental to the system concept. There are some practical consequences associated with the choice of algorithm, but in principle, almost any reliable algorithm could be used.

Most algorithms used for adaptive antenna control (spatial filter only) are specialized to the structure of that problem—which is that the output is a linear combination of the antenna element signals, and a meaningful measure of performance is quadratic in the weights. This structure leads to the simple forms of the least mean square and sample matrix inversion approaches. But the architecture of the integrated spatial-temporal filter has a dynamic element, adaptive temporal filter 14, in the path between the points where the beam is formed and the output of importance appears. Therefore these simple algorithms do not suffice.

Most algorithms applicable to general function minimization or maximization are based on the gradient of the criterion with respect to the parameters to be optimized. The LMS algorithm is a special case of a gradient search. In the case of the spatial filter only, the gradient of a quadratic criterion with respect to the antenna weights can be measured in a simple manner. For the more complex configuration of the spatial-temporal filter, it is far more difficult computationally to measure the gradient. So the only practical alternatives are so-called direct search algorithms which do not require gradient information. They control the search for optimum using only evaluations of the criterion to be optimized.

Among direct search methods, the most commonly used is sequential search, in which one searches on one parameter at a time for the optimum point with respect to that parameter. This is not very efficient because the optimum point with respect to each parameter depends on the values of the other parameters. In each cycle of minimizations, the values of all the parameters are changed, so the complete cycle of minimizations must be repeated many times until the process converges on the true minimum point.

The preferred embodiment of this invention utilizes a modification of the Hooke and Jeeves algorithm as discussed above which achieves some degree of efficiency relative to sequential search. This algorithm also uses tests for improvement with respect to each parameter one at a time in the Local Search mode, but that is followed by the Pattern Move mode in which all parameters are adjusted at once to do a search in the direction found to be favorable in the Local Search. The Pattern Move accelerates progress toward the optimum relative to any logic that restricts the trials to adjustment of one parameter at a time.

The importance of how the resources of an array antenna followed by an adaptive temporal filter (a spatial-temporal filter) are managed is illustrated in FIGS. 16–21. These figures relate to a N=4 element antenna array and a jamming environment of three narrowband and two wideband jammers. In this case, the antenna does not have enough resources to form beam pattern nulls on all five jammers, so effective suppression of all the interference depends on synergistic behavior between the two sections of the filter system in accordance with this invention.

Figure 16:
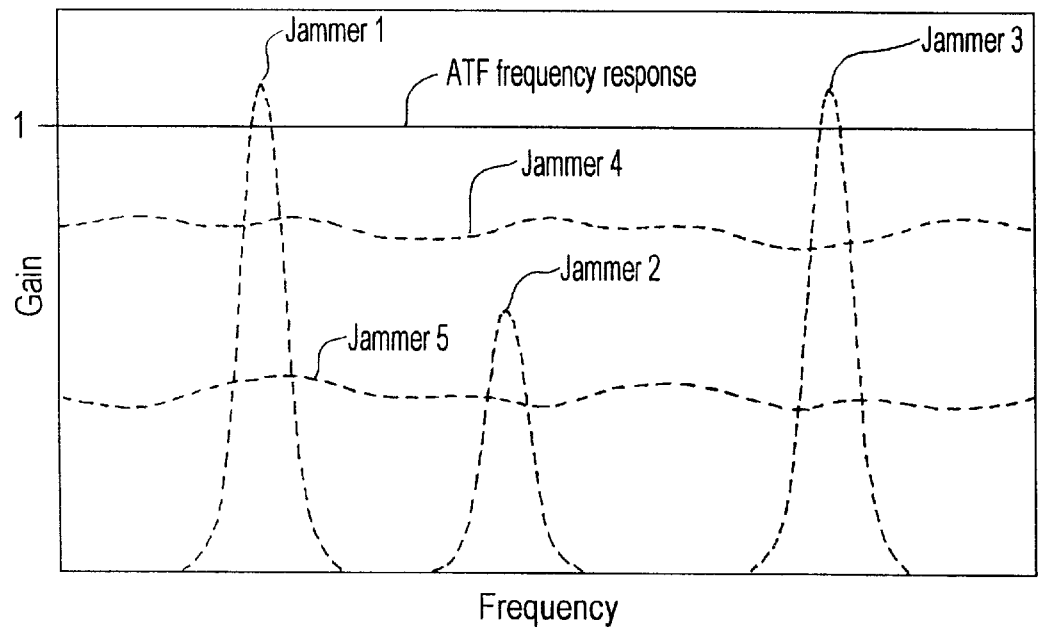
FIGS. 16–21 are charts which graphically depict the operation of the system of this invention.
Figure 17:
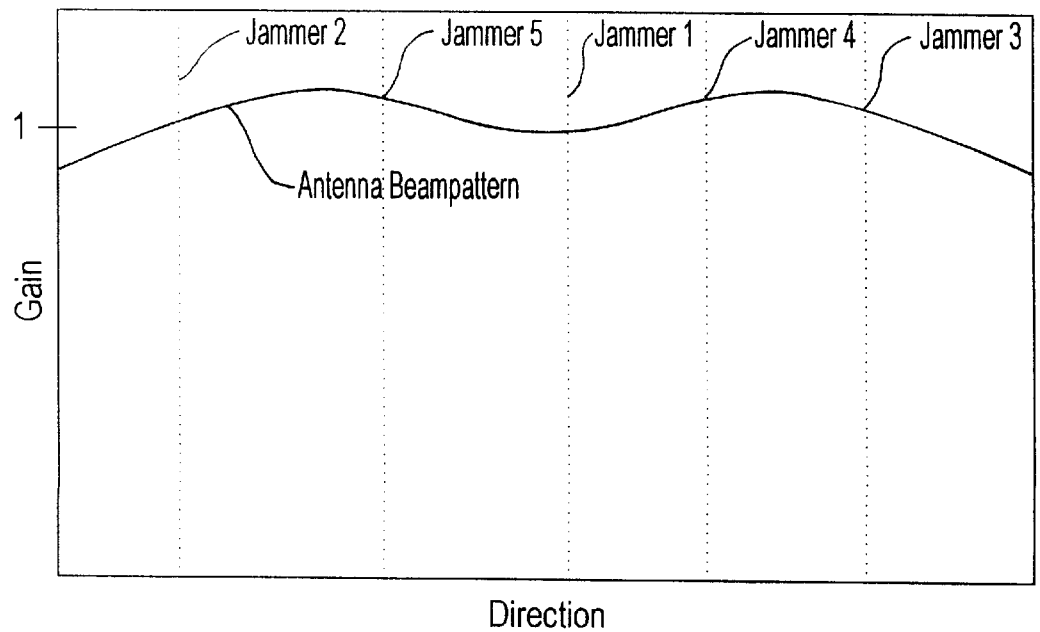

FIGS. 16 and 17 show the initial condition situation. Jammers 1,2 and 3 have narrowband spectra and jammers 4 and 5 have wideband spectra. They are seen in five different directions. With the weights W at their initial conditions, temporal filter 14 has an all-pass frequency response characteristic. With the antenna weights at their initial conditions, the antenna beam pattern has no distinguishing characteristics. So all the interference would pass through the system to its output.

Figure 18:
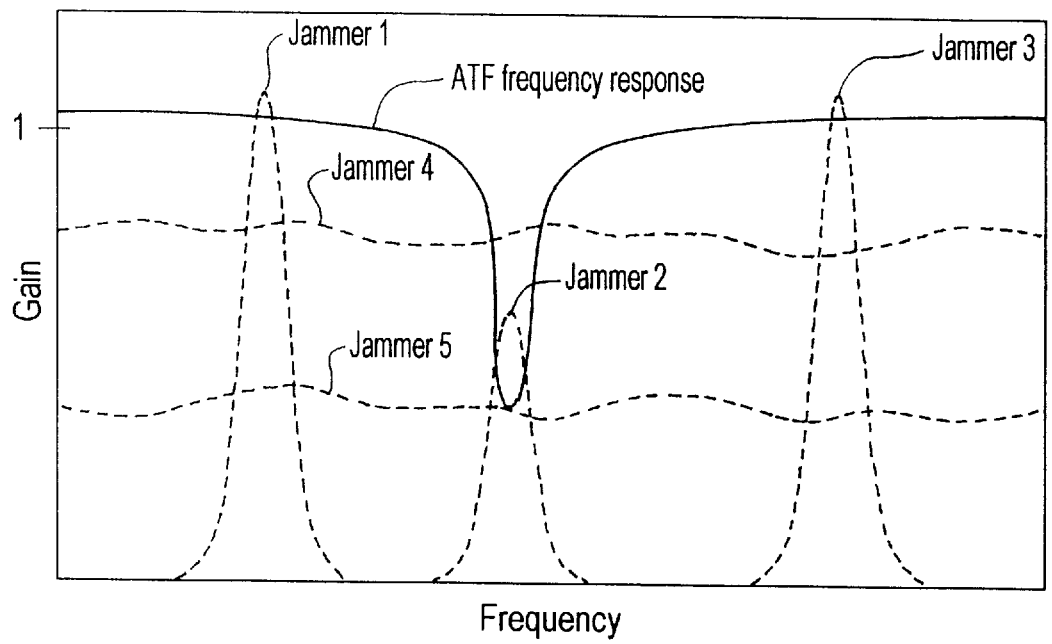
Figure 19:
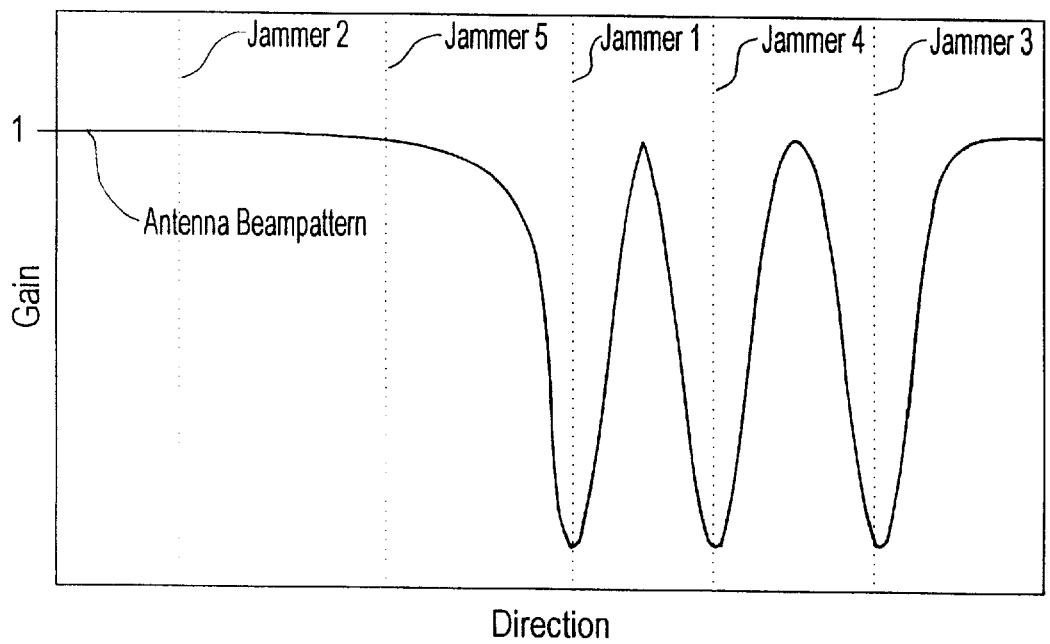

As discussed in the Background of the Invention, one method of controlling such a filter system which has been tried, without success, is known as cascaded control. In this filter architecture, the adaptive temporal filter is simply added at the output of an adaptive antenna array. Each filter, however, is controlled independently by the same logic as each uses when acting alone. There is no feedback subsystem or function. The resulting performance in this example is illustrated in FIGS. 18–19. The adaptive antenna forms as many beam pattern nulls as it can on the strongest sources of interference. In this example, two of the strongest jammers are narrowband, so the prior art antenna suppresses two narrowband and one wideband jammer. But this leaves one wideband jammer unattenuated and it passes through to the adaptive temporal filter which is ineffective against wideband interference. So jammer number five's signal passes through the filter system to its output and effectively jams the GPS receiver.

Figure 20:
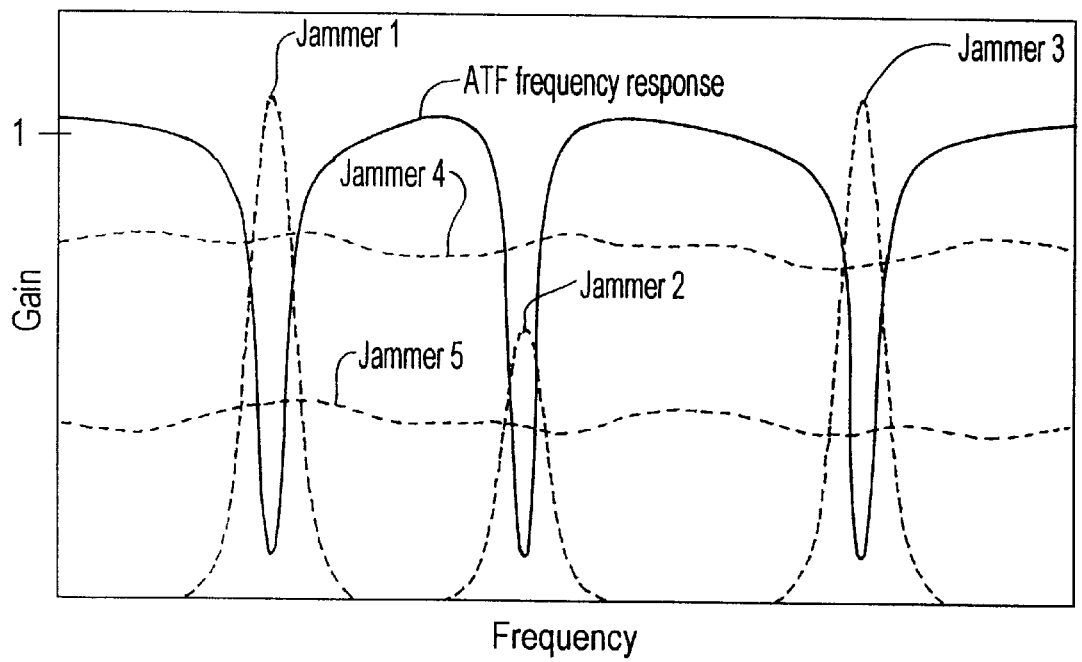
Figure 21:
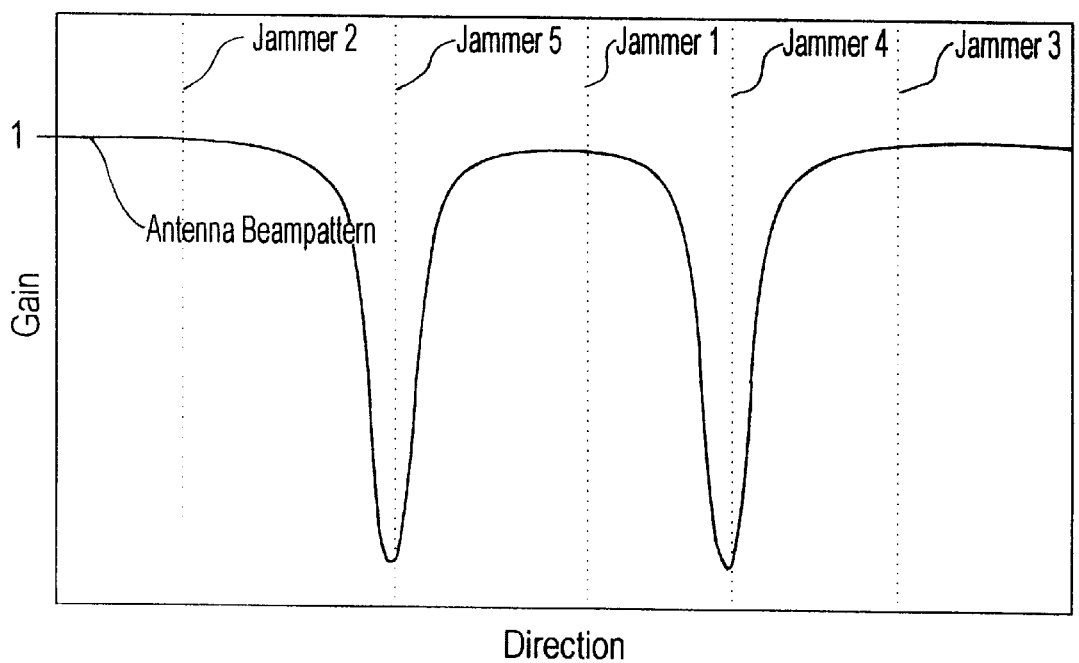

Feedback subsystem 16 of this invention, effects integrated control and thus the available system resources are better utilized. The antenna weights are adjusted to place beam pattern nulls on both wideband jammers. It may attenuate one of the narrowband jammers as well, but this is of no consequence because all three narrowband jammers can be notched out by ATF 14, FIG. 3. This situation is illustrated in FIGS. 20 and 21. With all the wideband interference strongly attenuated before the signal reaches ATF 14, it sees a low background noise floor and can suppress the narrowband interference very effectively.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An integrated adaptive spatial-temporal system for controlling narrowband and wideband sources of interference, the system comprising:

an N element antenna array which receives a spread spectrum signal and interference signals, each element receiving a different phase shifted version of the spread spectrum and interference signals;

a spatial filter including an antenna pattern former responsive to the antenna array which combines the phase shifted spread spectrum and interference signals according to controlling weights to null N−1 of the interference signals;

an adaptive narrow band filter responsive to the spatial filter for filtering any remaining narrowband interference signals from the combined signal; and a feedback subsystem responsive to the narrow band filter for adjusting the controlling weights of the antenna pattern former until the operation of the spatial filter is optimized and nulls wideband interference signals before narrowband interference signals.

2. The system of claim 1 in which the adaptive narrow band filter is a temporal filter.

3. The system of claim 1 in which the feedback subsystem includes a processor programmed to calculate the signal-to-interference-plus-noise-ratio (SINR) at the output of the narrow band filter and to adjust the controlling weights until the SINR is maximized.

4. The system of claim 1 in which the feedback subsystem includes power measurement means for determining the output power of the narrow band filter.

5. The system of claim 4 in which the feedback subsystem further includes weight controller means for searching for a set of weights which optimize the operation of the spatial filter.

6. The system of claim 5 in which the weight controller means includes a cost function algorithm and a closed loop optimizer.

7. The system of claim 1 in which the feedback subsystem includes power measurement means for measuring the average squared magnitude of the output from the narrow band filter.

8. The system of claim 1 in which the feedback subsystem includes a weight controller including an algorithm for adjusting the controlling weights.

9. The system of claim 1 in which the spread spectrum signal is transmitted by Global Positioning System satellites.

10. The system of claim 2 in which the SINR is the signal power at the output of the narrow band filter divided by the total power at the output of said filter wherein the signal power is computed from the beam pattern formed by a given set of antenna weights, and the total power is measured as the average squared magnitude of the output signal.

11. System for controlling narrowband and wideband sources of interference, the system comprising:

a spatial filter responsive to an antenna array for nulling interference signals received with a spread spectrum signal;

a narrowband filter with an input responsive to the spectrum signal and an output for transmitting the filtered spread spectrum signal, the narrowband filter for filtering any remaining narrowband interference signals from the spread; and means for analyzing the output of the narrow band filter and in response adjusting the spatial filter.

12. A system for controlling narrowband and wideband sources of interference, the system comprising:

a spatial filter responsive to an antenna for nulling interference signals received with a spread spectrum signal;

a narrow band filter with an input responsive to the spatial filter for filtering any remaining narrowband interference signals from the spread spectrum signal and an output for transmitting the filtered spread spectrum signal; and a feedback subsystem having an input connected to the output of the narrow band filter and an output connected to the spatial filter.

13. A method for controlling narrowband and wideband sources of interference, the method comprising:

nulling interference signals received with a spread spectrum signal in a spatial filter;

filtering any remaining narrow band interference signals in an adaptive narrow band filter and transmitting the filtered spread spectrum signal; and analyzing the output of the narrow band filter and in response adjusting the spatial filter.

14. The method of claim 13 in which analyzing includes determining an output power of the narrow band filter.

15. The method of claim 14 further including searching for a set of weights which optimize the operation of the spatial filter.

16. The method of claim 13 in which analyzing includes calculating the signal-to-interference-plus-noise-ratio (SINR) at the output of the narrow band filter and adjusting the controlling weights until the SINR is maximized.

17. The method of claim 13 in which analyzing includes measuring the average squared magnitude of the output from the narrow band filter.

18. The method of claim 16 in which the SINR is the signal power at the output of the narrow band filter divided by the total power at the output of said filter wherein the signal power is computed from the beam pattern formed by a given set of antenna weights, and the total power is measured as the average squared magnitude of the output signal.

19. A method for controlling narrow band and wide band sources of interference, the method comprising:

using an N element antenna array to receive a spread spectrum signal and interference signals, each element receiving a different phase shifted version of the spread spectrum and interference signal;

combining the phase shifted spread spectrum and interference signals in a spatial filter according to controlling weights to null N−1 of the interference signals;

filtering any remaining narrowband interference signals in the combined signal in an adaptive narrow band filter; and adjusting the controlling weights until the operation of the spatial filter is optimized and nulls wideband interference signals before narrowband interference signals.

20. The method of claim 19 in which the adjusting step includes calculating the signal-to-interference-plus-noise-ratio (SINR) at the output of the narrow band filter and adjusting the controlling weights until the SINR is maximized.

21. An integrated adaptive spatial-temporal system for controlling narrowband and wideband sources of interference, the system comprising:

an N element antenna array which receives a spread spectrum signal and interference signals, each element receiving a different phase shifted version of the spread spectrum and interference signals;

a spatial filter including an antenna pattern former responsive to the antenna array which combines the phase shifted spread spectrum and interference signals according to controlling weights to null N−1 of the interference signals;

an adaptive narrow band filter responsive to the spatial filter for filtering any remaining narrowband interference signals from the combined signal; and a feedback subsystem responsive to the narrow band filter for adjusting the controlling weights of the antenna pattern former until the operation of the spatial filter is optimized and nulls wideband interference signals before narrowband interference signals, the feedback system including a processor programmed to calculate the signal-to-interference-plus-noise-ratio (SINR) at the output of the narrowband filter and to adjust the controlling weights of the antenna pattern former until the SINR is maximized.

* * * * *